Figure 1:
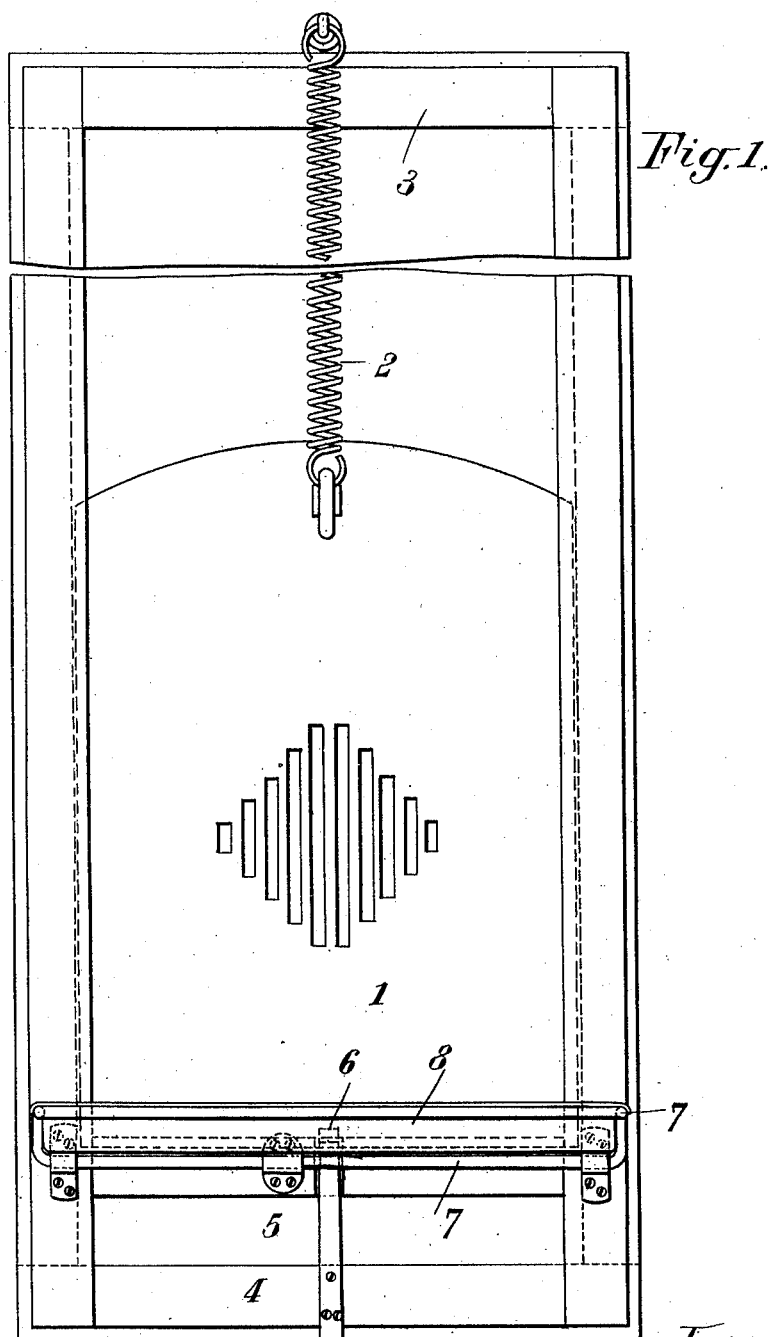

M. H. PERRET.
CLOSING DEVICE FOR POULTRY HOUSE PASSAGES.
APPLICATION FILED DEC. 24, 1910.

997,153.

Patented July 4, 1911.

M. H. PERRET.
CLOSING DEVICE FOR POULTRY HOUSE PASSAGES.
APPLICATION FILED DEC. 24, 1910.
997,153.
Patented July 4, 1911.
2 SHEETS—SHEET 2.
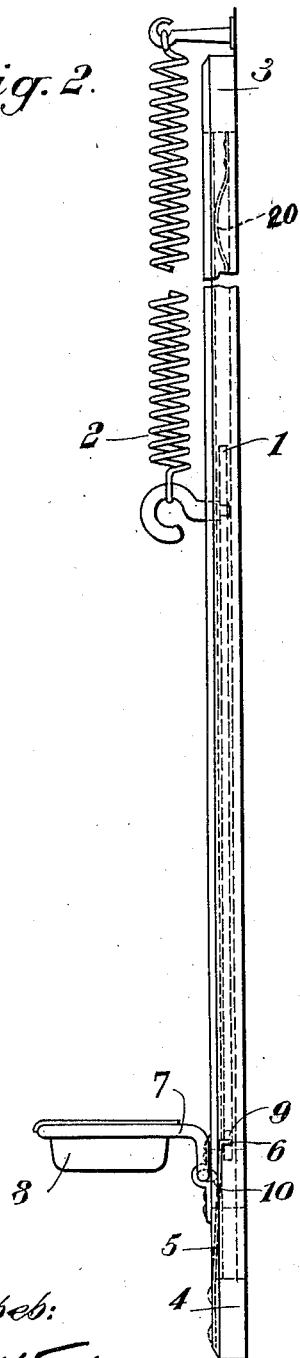
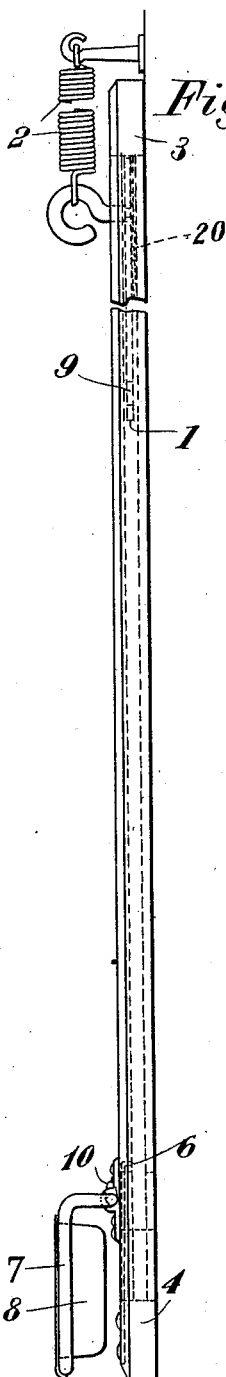
Witnesses:
Inventor:
Maurice Hermann Perret
Attorney.

UNITED STATES PATENT OFFICE.

MAURICE HERMANN PERRET, OF HARBURG, GERMANY.

CLOSING DEVICE FOR POULTRY-HOUSE PASSAGES.

997,153.  Specification of Letters Patent.  Patented July 4, 1911.

Application filed December 24, 1910. Serial No. 599,120.

*To all whom it may concern:*

Be it known that I, MAURICE HERMANN PERRET, a citizen of the United States of America, and resident of Harburg, Germany, have invented a certain new and useful Closing Device for Poultry-House Passages, of which the following is a specification.

In order to protect poultry, in the poultry house from the nocturnal penetration of vermin, the outlet passage of the poultry house is usually closed by means of a sash door. On the other hand it is necessary for the thriving of the poultry to allow the animals to go out as early as possible in the morning that is to say at sun-rise. The person in charge of the poultry house must consequently open the sash door at daybreak. Now the present invention relates to a device adapted to be applied to a sash door of the kind described above and allowing of the poultry house door being opened from the inside of the poultry house and this by the poultry itself when they wish to leave the poultry house at daybreak.

In the accompanying drawings, given by way of example, one form of embodiment of the invention is shown and in these drawings: Figure 1 shows a front elevation view of the sash door. Fig. 2 shows a side elevation view of same in a closed state; Fig. 3 is a similar view of the door in an opened condition.

The closing and locking device which forms the subject matter of this invention, is constructed in the following manner: The door 1 which moves vertically in the well known manner in a sash frame, is suspended through the medium of a weak coiled spring 2 from the upper cross beam 3 of the said frame and this in such a manner that under ordinary circumstances, it is positioned in the upper part of the frame thus leaving the lower part open which forms the way out passage proper of the poultry house.

Screwed on the inner face of the lower cross bar 4 of the door frame which lower cross bar has to this end been enlarged, is a vertical flat spring 5. This spring is adapted to move in a notch provided in the said lower cross bar and the upper free end of the said flat spring has been bent in such a manner that it forms a hook or a latch 6. On the inner face of the lower cross bar 4 and transversely with reference to the aforesaid spring latch 5, a rocking frame 7 made of wire has been mounted in a rotary manner. This rocking frame 7 is adapted to receive a small trough like manger 8. The rocking frame 7 and its trough are under ordinary conditions depending in such a manner that the bottom of the trough is applied against the inner face of the lower cross bar 4 and is consequently in a vertical plane. If it is desired to close the sash door, it will be necessary to cause it to descend down to the lower cross bar of the frame against the traction of the coiled spring 2. When the door has thus been lowered, the hook 6 of the spring latch is engaged into a hole 9 provided in the door 1 near the lower edge thereof. It follows therefrom that the door is held in its lower position (closing position) in spite of the tractional effort which the spring 2 exerts thereon.

In order to engage and hold the spring latch or hooked spring 6 in the corresponding hole of the sash door, the wire rocking frame 7 (as well as its small trough 8) are raised and caused to rotate from the vertical position (Fig. 3) into the horizontal one (Fig. 2). During this raising motion, a cam or nose 10 provided on the rocking frame 7 presses the spring latch into the notch of the cross beam 4 and pushes the hook 6 of the latch into the hole 9 of the sash door. When the above described parts are left in the position described, the locking of the door is obtained, as the wire rocking frame 7 as well as its small trough 8 are held in their horizontal position by the pressure which is exerted thereon by the spring latch 5. The small trough 8 may be removed and may receive food.

In the evening the device is adjusted in the manner described above, that is to say that the door is shut. At daybreak the thus inclosed poultry comes near the door. Now, as soon as one of the animals touches while picking, the wire frame or rests its foot on it, the rocking frame 7 leaves its horizontal position and the cam (or nose) 10 frees the spring latch 5 which returning into its position of rest sets the sash door free. The said sash door under the action of the coiled spring 2 rises rapidly thus producing the opening of the outlet passage of the poultry house. The first few days in order to accustom the poultry to actuate the door, one may render their work easier by throwing some food into the small trough when one closes the door at night. If it is desired to deaden the shock produced by the door during its rising motion, a brake formed by a spring 20 may be provided in one of the grooves of the frame which the door slides.

Having now fully described my said invention, what I claim and desire to secure by Letters Patent is:—

1. In a poultry house, the combination of a door frame formed with an opening, a door mounted in the frame, a spring latch to engage the door when closed, a movable frame provided with a cam and mounted on the inside of the door frame, said cam being in contact with the spring latch when in set position to lock the door when closed, and means for opening the door when the cam has been moved away from the spring latch by the poultry.

2. In a poultry house the combination with the outlet passage of a door frame, a vertically sliding sash door in said door frame, a coiled spring secured at its upper end to the upper cross bar of said door frame and at its lower end to the said sash door, a spring latch provided on the inside of the lower cross bar of said door frame and adapted to engage the said sash door and to hold it in its closing position, a wire frame rotarily mounted on the inside of the said lower cross bar, a trough adapted to be inserted in and carried by the said wire frame, and a cam provided on said wire frame and adapted to press the said spring latch in its locking position when the said wire frame and trough occupy their horizontal projecting position and to release said spring latch and with it the sash door when the said wire frame and its trough are tilted down by the poultry, substantially as and for the purpose described.

3. In a poultry house, the combination of a door frame formed with an opening, a door slidably mounted in the frame, a spring latch to engage the door when closed, a rocking frame provided with a cam and mounted on the inside of the door frame, said cam being in contact with the spring latch when in set position to lock the door when closed, and means for opening the door when the frame and cam have been rocked to move the cam away from the spring latch by the poultry.

MAURICE HERMANN PERRET.

Witnesses:
ERNEST H. L. MUMMENHOFF,
IDA CHRIST. HAFERMANN.

---

Copies of this patent may be obtained for five cents each, by addressing the "Commissioner of Patents, Washington, D. C."